United States Patent
Guskov et al.

(10) Patent No.: US 6,769,275 B2
(45) Date of Patent: Aug. 3, 2004

(54) METHOD FOR MAKING OPTICAL FIBER PREFORM USING SIMULTANEOUS INSIDE AND OUTSIDE DEPOSITION

(75) Inventors: Mikhail I. Guskov, St. Petersburg (RU); Eugenie B. Danilov, St. Petersburg (RU); Wolfgang Hammerle, Jena (DE); Mohd A. Aslami, Sturbridge, MA (US); Dau Wu, San Diego, CA (US)

(73) Assignee: FiberCore, Inc., Charlton, MA (US)

( * ) Notice: Subject to any disclaimer, the term of this patent is extended or adjusted under 35 U.S.C. 154(b) by 0 days.

(21) Appl. No.: 10/097,857

(22) Filed: Mar. 15, 2002

(65) Prior Publication Data

US 2003/0172681 A1 Sep. 18, 2003

(51) Int. Cl.[7] .............................................. C03B 37/018
(52) U.S. Cl. ............................. 65/414; 65/417; 65/421
(58) Field of Search ...................... 65/17.4, 385, 391, 65/413, 414, 417, 422, 421

(56) References Cited

U.S. PATENT DOCUMENTS

| | | | | |
|---|---|---|---|---|
| 4,265,649 A | * | 5/1981 | Achener | 65/391 |
| 5,596,668 A | * | 1/1997 | DiGiovanni et al. | 385/123 |
| 5,609,666 A | * | 3/1997 | Heitmann | 65/421 |
| 5,711,782 A | * | 1/1998 | Okamura et al. | 65/390 |
| 6,131,415 A | * | 10/2000 | Chang et al. | 65/391 |
| 6,215,092 B1 | * | 4/2001 | Goudeau et al. | 219/121.59 |
| 6,253,580 B1 | * | 7/2001 | Gouskov et al. | 65/391 |
| 6,532,775 B1 | * | 3/2003 | Campion et al. | 65/391 |
| 6,536,240 B1 | * | 3/2003 | Gouskov et al. | 65/391 |
| 6,574,994 B2 | * | 6/2003 | Cain et al. | 65/391 |
| 2002/0178761 A1 | * | 12/2002 | Cummings et al. | 65/417 |
| 2002/0189296 A1 | * | 12/2002 | Cain et al. | 65/391 |
| 2003/0089133 A1 | * | 5/2003 | Caplen et al. | 65/391 |

* cited by examiner

Primary Examiner—Steven P. Griffin
Assistant Examiner—Carlos Lopez
(74) Attorney, Agent, or Firm—Patton Boggs LLP

(57) ABSTRACT

A method and apparatus for making optical fiber preforms using simultaneous plasma deposition on the inside and outside surface of a starting tube. A starting tubular member is rotated, CFOT chemicals are selectively injected into the plasma torch, and CFIT chemicals are selectively injected to flow through the hollow of the tube. The plasma torch is traversed along the tubular member to simultaneously deposit soot on the inside and outside surface. The soot on one or both surfaces may be consolidated into a silica layer as it is deposited. The plasma torch is traversed again to deposit additional soot, and/or consolidate previously deposited soot, on one or both surfaces. The process is repeated until a predetermined amount of silica is formed on the tubular member. The tubular member is then collapsed. Optionally, additional plasma deposition is performed during or after the collapsing.

22 Claims, 7 Drawing Sheets

METHOD FOR MAKING OPTICAL FIBER PREFORM USING SIMULTANEOUS INSIDE AND OUTSIDE DEPOSITION

BACKGROUND OF THE INVENTION

1. Field of the Invention

The present invention is directed to a method and apparatus for making an optical fiber preform and, more particularly, to a method and apparatus for making an optical fiber preform using a plasma torch and including one or more steps of substantially simultaneous inside deposition and/or consolidation and outside deposition and/or consolidation.

2. Statement of the Problem

Various methods and apparatus for making optical fiber preforms are known in the optical fiber industry and described in its related publications. For example, U.S. Pat. No. 6,253,580 ("the '580 patent") describes a Plasma Outside Vapor Deposition ("POVD") process for making synthetic silica tubes. The synthetic silica tubes made in accordance with the '580 invention can be used as a substrate or as a jacketing tube in fabricating optical fiber preforms by the Modified Chemical Vapor Deposition ("MCVD") methods. Further, the processing rate and quality of synthetic silica tubes made in accordance with the '580 patent is favorable based on many of the presently established criteria. However, improved processing rate and quality are always desirable. Cost, though, is another factor that must always be considered.

The prior art shows numerous methods for making preforms and other fiber-related glass and silica products. These include the MCVD process such as disclosed by, for example, U.S. Pat. No. 3,982,916 to Miller and Pat. No. 4,217,027 to MacChesney. These also include the Plasma Chemical Vapor Deposition process such as disclosed by, for example, U.S. Pat. Nos. 4,741,747 and 4,857,091, both to Geittner et al. Further included is the MCVD with radio frequency ("rf") plasma process such as disclosed by, for example, U.S. Pat. No. 4,262,035 to Jaeger et al. and Pat. No. 4,331,462 to Fleming et al., and the method of MCVD with a plasma torch such as disclosed by, for example, U.S. Pat. Nos. 5,397,372 and 5,692,087, both to Partus et al.

The present inventors have identified that the processes and methods disclosed by the above-listed patents have various shortcomings with respect to current and future requirements for production rate and fiber quality.

Other methods known in the prior art include the Outside Vapor Deposition Process ("OVD") disclosed by U.S. Pat. No. 3,737,292 to Keck and U.S. Pat. No. 3,932,162 to Blakenship, and the Vapor Axial Deposition ("VAD") process disclosed by, for example, U.S. Pat. Nos. 4,062,665 and 4,224,04, both to Izawa et al. The present inventors, though, have identified that the processes and methods as disclosed by the above-listed patents have various shortcomings including, for example, the necessity for performing separate steps for sintering or consolidation of the deposited silica.

Still other known methods for making preforms include the method of sleeving and collapsing a tube or tubes on a primary preform using, for example, a plasma torch, as disclosed by U.S. Pat. No. 5,578,106 to Fleming et al., or an oxygen-hydrogen torch, as disclosed by U.S. Pat. No. 4,596,589 to Perry and U.S. Pat. No. 4,820,322 to Baumgart. The present inventors have identified shortcomings with all of these methods, including, for example, the requirement for a jacketing process.

The prior art also includes the overcladding process as disclosed by U.S. Pat. No. 5,522,007 to Drourt. These methods include the steps of building up a large diameter preform by depositing cladding glass onto a primary preform, using a plasma torch. A typical shortcoming of overcladding is its necessary addition of one or more additional steps, namely that the primary preform be made first, followed by adding the overcladding layers, which adds time and equipment costs.

It is known in the optical fiber industry that one method for lowering cost, and for increasing processing rate, is to make larger preforms. For example, as reported by Glodis et al. in U.S. Pat. No. 6,105,396 ("the '396 patent"), a preform can be made which generates approximately 400 kilometers of fiber.

The benefits of making larger preforms manifest in at least two stages, or steps, of manufacturing fiber—the preform fabrication step and the fiber draw step. Regarding the first step, the immediate benefit that is seen from using a larger preform is that the larger the preform the greater the length of fiber that it produces.

For example, the set-up and inspection time for making the larger preform should not be substantially longer than the set-up and inspection time for making smaller preforms. This is an important consideration because the initial set-up for fabricating a preform, together with the post-processing inspections, occupy a significant percentage of the time required to fabricate a preform. Therefore, more net increase in manufacturing efficiency is gained when using a larger preform if the set-up and inspection times during its manufacture are kept substantially the same as those for a smaller preform.

Improved fiber quality is another benefit gained by using a larger preform. This is because drawing fiber is basically a stretching of the preform volume. A larger diameter preform has a greater volume per unit length and, therefore, when compared to a smaller diameter preform, a shorter linear section of the preform is required to form the same length of fiber. The optical qualities of a preform typically vary along its length. Therefore, since the larger preform requires less length to produce a given length of fiber, fiber drawn from it has a correspondingly lower rate of variation per unit length than would be seen in fiber drawn from a smaller preform.

There are other objectives that must be met when fabricating larger preforms so that the larger size provides a practical, usable increase in manufacturing efficiency. Low equipment cost is one of these objectives. Namely, the decrease in cost that can be obtained by fabricating larger preforms will be maximized by a method that requires minimum purchase and installation of new equipment.

Another problem relating to MCVD processes, and to making larger preforms, is the incomplete oxidation of dopants flowing through the hollow or void in the tube. A reason is that the base glass chemical, such as $SiCl_4$, and the dopant chemicals, such as $GeCl_4$, $POCl_3$ and $SF_6$, flow together into the hollow. Because of the plurality of reactants present, there are multiple chemical reactions that result. A typical effect of the multiple reactions is that only one is essentially completed, this frequently being the reaction of $SiCl_4$ vapors with $O_2$. In contrast, the dopant oxidation reactions are frequently not complete. For example, in the conventional MVCD manufacturing of germanium doped silica, a large fraction of the dopant appears in the gaseous effluent in the form of $GeCl_4$. Published reports such as "Germanium Chemistry in the MCVD Process for Optical Fiber Fabrication," J. of Lightwave Technology, LT-5, no.2, 1987, 277–285, show that as much as 70% of the initial germanium flowing into the hollow is present in the effluent as $GeCl_4$.

SUMMARY OF THE INVENTION

The present invention provides an apparatus and method for making an optical fiber preform using plasma deposition on a silica tube, where at least a portion of the process performs concurrent deposition, consolidation, or deposition/consolidation of silica on the inside and the outside of the tube. Certain steps within the described embodiments deposit soot, without consolidation, on one of the inner and outer surfaces of the tube, concurrent with simultaneous deposition and consolidation of soot on the other of the inner and outer surface. Other steps perform concurrent deposition, without consolidation, followed by concurrent consolidation, with or without deposition of additional soot during the concurrent consolidation pass. The total deposition rate is increased over the prior art due to the concurrent deposition of soot on the inner and outer surfaces of the tube. The deposition rate is also increased by the invention setting the rate of traversing the plasma flame in accordance with the desired concurrent inner and outer surface deposition and the desired inner and outer surface consolidation.

The apparatus and method of the present invention achieves this simultaneous formation of silica layers on the inside and outside of the tube by various multistep methods that traverse a plasma along a rotating tube, selectively injecting reaction-producing chemicals into the hollow, or void of the tube, while selectively injecting other reaction-producing chemicals into the plasma. The chemicals injected into the hollow, collectively referenced as "CFIT", and the chemicals injected into the plasma, collectively referenced as "CFOT", chemicals undergo chemical reactions due to the heat from the plasma torch. The reactions cause one or more of the following operations on the inside and/or outside of the tube: a deposition of soot, a consolidation of a soot previously deposited to form a vitreous silica layer, or a simultaneous deposition of soot and consolidation of same into a vitreous silica layer. The operations can be the same on the inside and the outside, or one may be performed on the inside while another is performed on the outside. The respective operations can be different as the plasma torch is traversed in one direction down the tube as compared to the operations performed as the plasma is traversed in the opposite direction. The vitreous silica layer can be either doped or undoped, depending on the makeup of the CFIT and CFOT chemicals. Accordingly, the phrases "vitreous silica layer" and "silica layer" are each defined to include both doped and undoped silica unless otherwise stated or clear from the context in which it is used.

An apparatus according to the invention includes a workpiece rotation apparatus such as, for example, a glassworking lathe, for securing and rotating a hollow tubular silica member about a center axis, a movable support for a plasma torch, a plasma torch having a plasma generating coil secured to the movable support for generating a plasma flame incident on an outer surface of the hollow tubular silica member, a first translation actuator for moving the movable support and the plasma torch at a selectable translation rate parallel to the center axis, a second translation actuator for selectively moving the movable support toward and away from the center axis to space the coil selectively with respect to an outer surface of the tubular member, a source chemical controller feeds for selectively injecting CFIT source chemicals into the hollow of the tubular member while the tubular member is rotating, and another source chemical controller feeds for selectively injecting CFOT source chemicals into the plasma flame generated by the plasma torch.

Optionally, a distance sensor is operatively connected to the second translation actuator, for detecting a distance between a reference point relative to the plasma torch and the outside surface of the tubular member and generating a distance signal based on the detected distance. A processor generates a translation control signal based on the distance signal and a predetermined distance value. The second translation actuator receives the translation control signal and moves in accordance with it.

One aspect of the invention is a method for making an optical fiber preform including steps of: (a) providing a silica tubular member, the silica tubular member having an interior surface surrounding a cylindrical void extending along a center axis and having an exterior surface coaxial with the center axis, (b) rotating the silica tubular member about the center axis, (c) forming an outer vitreous silica layer on the outer surface of the tube concurrent with forming a selectively doped inner vitreous silica layer on the inner surface of the tube, (d) depositing an outer soot layer on the outer vitreous silica layer, (e) consolidating the outer soot layer deposited at step (d) into an outer vitreous silica layer concurrent with forming along the length of the tube an outer vitreous silica layer on the outer surface of the tube, concurrent with forming a selectively doped inner vitreous silica layer on the inner surface of the tube, and (f) repeating steps (d) and (e) until a predetermined thickness of inner vitreous silica layers is formed.

This aspect of the invention performs steps (c) and (e) by, for example, traversing a plasma flame in a first direction along the rotating tubular member at a first forward traversal rate TF1 while injecting CFIT chemicals into the cylindrical void to flow in the first direction and, concurrently, injecting CFOT chemicals into the plasma. For this example performance of steps (c) and (e), the generating of the plasma and the first traversal rate are such that the plasma deposits an outer layer of soot and consolidates that soot and, for step (e), also consolidates the soot deposited at step (d), into an outer vitreous silica layer in accordance with the CFOT chemicals. The generation of plasma and the first forward traversal rate are also such that substantially simultaneous to the deposition and consolidation of the outer vitreous silica layer, the plasma effects depositing of inner soot particles and concurrent consolidation of same into an inner layer of vitreous silica selectively doped in accordance with the CFIT chemicals.

The first aspect of the invention may perform step (d) by, for example, traversing the plasma at a first reverse traversal rate TR1 in a direction opposite the first direction, with no substantial CFIT chemicals flowing into the void, while injecting CFOT chemicals into the plasma, where the plasma, the CFOT chemicals and the first reverse traversal rate are such that a soot in accordance with the CFOT chemicals is deposited without substantial consolidation.

A second aspect of the invention is a method for making an optical fiber preform including steps of: (a) providing a silica tubular member, the silica tubular member having an interior surface surrounding a cylindrical void extending along a center axis and having an exterior surface coaxial with the center axis, (b) rotating the silica tubular member about the center axis, (c) forming an outer vitreous silica layer along a length of the tube above the outer surface of the tube concurrent with forming a selectively doped inner vitreous silica layer along the length of the tube inward from the inner surface of the tube, (d) depositing an outer soot layer on the outer vitreous silica layer and, concurrent with depositing the outer soot layer, depositing a selectively dopes inner soot layer on the inner vitreous silica layer, (e) consolidating the outer soot layer deposited at step (d) concurrent with forming an outer vitreous silica layer on the outer surface of the tube, concurrent with consolidating the inner soot layer deposited at step (d) concurrent with forming a vitreous silica layer on the inner surface of the tube, and (f) repeating steps (d) and (e) until a predetermined thickness of vitreous silica layers is formed by the steps.

A method according to the second aspect of the invention may perform steps (c) and (e) by, for example, traversing a plasma flame in a first direction along the rotating tubular member at a second forward traversal rate TF2 while injecting CFIT chemicals into the cylindrical void to flow in the first direction and injecting CFOT chemicals into the plasma. The generation of the plasma and the second forward traversal rate for such an example performance of steps (c) and (e) are such that the plasma deposits an outer layer of soot and consolidates the soot and, for step (e), also consolidates the outer soot layer deposited at step (d), into an outer vitreous silica layer in accordance with the CFOT chemicals. Further, substantially simultaneous to the deposition and consolidation of the outer vitreous silica layer, the plasma effects depositing of inner soot particles and concurrent consolidation of same and consolidation of the inner soot layer deposited at step (d) into an inner layer of vitreous silica selectively doped in accordance with the CFIT chemicals.

A method according to the second aspect of the invention may perform step (d) by, for example, traversing the plasma at a second reverse traversal rate TR2 in a direction opposite the first direction while injecting CFIT chemicals into the void to flow in the first direction and injecting CFOT chemicals into the plasma, where the plasma, the CFIT chemicals, the CFOT chemicals and the second reverse traversal rate are such that an inner soot layer in accordance with the CFIT chemicals and an outer soot layer in accordance with the CFOT are deposited without substantial consolidation.

A third aspect of the invention is a method for making an optical fiber preform including steps of: (a) providing a silica tubular member, the silica tubular member having an interior surface surrounding a cylindrical void extending along a center axis and having an exterior surface coaxial with the center axis, (b) rotating the silica tubular member about the center axis, (c) depositing an outer silica soot layer on the outer surface of the tubular member concurrent with depositing an inner soot layer inward on the inner surface of the tubular member, (d) concurrently consolidating the outer soot layer and the inner soot layer deposited at step (c) into, respectively, an outer vitreous silica layer and an inner vitreous silica layer, and (f) repeating steps (d) and (e) until a predetermined thickness of vitreous silica layers is formed by the steps.

A method according to the third aspect of the invention performs step (c) by, for example, traversing a plasma flame in a first direction along the rotating tubular member at a third forward traversal rate TF3 while injecting CFIT chemicals into the cylindrical void to flow in the first direction and injecting CFOT chemicals into the plasma. The generation of the plasma and the third traversal rate are such that the plasma deposits the outer layer of soot in accordance with the CFOT chemicals and, concurrently, effects deposition of the inner layer of soot in accordance with the CFIT chemicals.

Step (d) of a method according to the third aspect of the invention may be performed by, for example, traversing the plasma at a third reverse traversal rate TR3 in a direction opposite the first direction, preferably without injecting substantive CFOT chemicals into the plasma and without injecting substantive CFIT into the void. The third reverse traversal rate TR3 is set such that the inner soot layer and the outer soot layer deposited at step (c) are consolidated into, respectively, the inner vitreous silica layer and the outer vitreous silica layer.

A fourth aspect of the invention has similarity to the second aspect, but differs with respect to the steps of deposition and consolidation of silica on the inner surface of the tube. The fourth aspect of the invention is a method for making an optical fiber preform including steps of: (a) providing a silica tubular member, the silica tubular member having an inner surface surrounding a cylindrical void extending along a center axis and having an outer surface coaxial with the center axis, (b) rotating the silica tubular member about the center axis, (c) depositing an outer soot layer on the outer surface of the tubular member concurrent with depositing an inner soot layer of substantially pure silica on the inner surface of the tubular member, (d) depositing a second outer soot layer on the outer surface of the tubular member concurrent with consolidating the deposited second outer soot layer and the outer soot layer deposited at step (c) into an outer vitreous silica layer, concurrent with injecting dopant chemicals into the cylindrical void and consolidating the dopant chemicals and the inner substantially pure silica soot layer into an inner doped vitreous silica layer, and (e) repeating steps (c) and (d) until a predetermined thickness of outer vitreous silica layers and inner doped vitreous silica layers are formed.

A method according to this fourth aspect of the invention performs step (c) by, for example, injecting CFIT chemicals into the cylindrical void to flow in a flow direction and, while the CFIT chemicals are flowing, traversing a plasma flame along the rotating tubular member at a fourth reverse traversal rate TR4 in a direction opposite the flow direction injecting CFOT chemicals into the plasma. The CFIT chemicals promote formation of the substantially pure silica soot. In this example, the generating of the plasma and the fourth reverse traversal rate are such that the plasma deposits the outer layer of soot in accordance with the CFOT chemicals and, concurrently, effects deposition of the inner layer of substantially pure silica soot in accordance with the CFIT chemicals.

A method according to the fourth aspect of the invention performs step (d) by, for example, traversing the plasma at a fourth forward traversal rate TF4 in the flow direction while injecting CFOT chemicals into the plasma, while also injecting CFIT into the void, where the CFIT chemicals include dopants for modifying the index of refraction of the substantially pure silica inner soot layer deposited at step (c) without effecting formation of additional silica soot. The fourth forward traversal rate and the CFIT chemicals flowing during step (d), for this example performance of the step, are such that the dopants for modifying the index of refraction of the substantially pure silica inner soot layer deposited at step (c) are consolidated with the substantially pure silica soot layer to form an inner vitreous silica layer doped in accordance with the CFIT chemicals, without effecting formation of additional silica soot.

A fifth aspect of the invention has similarity to the first aspect, but differs with respect to steps of deposition and consolidation of silica on the outer surface of the tube. The fifth aspect of the invention is a method for making an optical fiber preform including steps of: (a) providing a silica tubular member, the silica tubular member having an inner surface surrounding a cylindrical void extending along a center axis and having an outer surface coaxial with the center axis, (b) rotating the silica tubular member about the center axis, (c) depositing an outer soot layer of substantially pure silica on the outer surface of the tubular member concurrent with depositing an inner layer of silica soot on the inner surface of the tubular member and consolidating the deposited soot into an inner layer of vitreous silica, (d) consolidating the outer layer of substantially pure silica soot deposited at step (c) into an outer layer of substantially pure vitreous silica, and (e) repeating steps (c) and (d) until a predetermined thickness of outer vitreous silica layers and inner vitreous silica layers are formed.

A method according to the fifth aspect of the invention performs step (c) by, for example, traversing a plasma flame in a first direction along the rotating tubular member at a fifth forward traversal rate TF5 while injecting CFIT chemicals into the cylindrical void to flow in the first direction and injecting CFOT chemicals into the plasma. The CFOT chemicals are preferably selected to promote formation of the substantially pure silica soot. The generating of the plasma and the fifth forward traversal rate TF5 are such that the plasma deposits the outer layer of substantially pure silica soot in accordance with the CFOT chemicals and, concurrently, effects deposition of the inner layer of silica soot in accordance with the CFIT chemicals.

A method according to the fifth aspect performs step (d) by, for example, traversing the plasma at a fifth reverse traversal rate TR5 in a direction opposite the first direction without injecting CFIT chemicals promoting additional formation of soot, deposited at step (c) without effecting formation of additional silica soot. The fifth reverse traversal rate consolidates the outside layer of substantially pure silica soot deposited at step (c) into an outer layer of substantially pure vitreous silica.

A variation of the first through fifth aspects of the invention includes a step of collapsing the tubular member into a preform. An example of this variation performs the collapsing step by generating a plasma with a predetermined collapsing temperature profile relative to the outer surface of the tubular member, and repeatedly traversing the plasma torch along the length of the tubular member.

A variation of the collapsing step includes periodically adjusting the temperature profile and the pressure differential between the inner and outer surfaces of the tubular member until the tubular member has collapsed into a preform.

Another variation of the collapsing step performs, concurrent with at least a portion of the repeated traversing of the plasma torch along the length of the tubular member collapsing, a step of forming additional vitreous silica layers above the outside surface of the tubular member. An example of this variation performs the forming of additional vitreous silica layers by injecting CFOT chemicals into the plasma as it is repeatedly traversed.

Still another variation of the first through fifth aspects of the invention, with or without the other variations, includes a further step of forming additional vitreous silica layers on the preform, by POVD, after the completion of the collapsing step.

Still another variation of the first through fifth aspects of the invention, with or without one or more of the other variations, is performing a step concurrent with or interspersed with one or more of the deposition or consolidation steps of measuring a distance from a reference point relative to the plasma torch and the outside surface of the tubular member and moving the plasma torch based on the sensed distance to maintain a predetermined spacing between the reference point and the outer surface.

A further aspect of the invention is a method for making a preform comprising steps of (a) providing a silica tubular member, the silica tubular member having an interior cylindrical surface surrounding a cylindrical void extending along a center axis and having an exterior cylindrical surface coaxial with the center axis, (b) rotating the silica tubular member about the center axis, (c) forming an outer silica layer along a length of the tube above the outer surface of the tube concurrent with depositing an inner soot layer along the length of the tube inward from the inner surface of the tube, (d) repeating step (c) until a predetermined thickness of outer vitreous silica layers or inner soot layers is formed by the step, (e) drying the tubular member with the formed outer vitreous silica layers and the deposited soot layers, (f) consolidating the deposited inner soot layers, and (e) collapsing the tubular member into a preform.

A variation of the first through sixth aspects of the invention, with or without one or more of the other variations, uses a lower quality starting tube that can be etched away by a plasma flame. This etching process traverses a plasma flame which also heats the inside of the tube. The plasma heating of the inside of the tube causes, concurrent with the etching, deposition and/or consolidation of soot on the inside of the tube.

An example method according to this variation has two steps. The first step repeatedly traverses the plasma to etch the tube from the outside and, preferably concurrently, to deposit silica soot and/or consolidate silica soot into vitreous silica on the inside of the tube. The first step is complete when the starting tube is etched away, leaving a new tube consisting of the vitreous silica consolidated on the inside of the starting tube. The second step performs the concurrent inside/outside deposition and/or deposition/consolidation performed by the previously described methods according to this invention, using the new tube as the starting tube. The first step may deposit the inner soot, and consolidate the soot in the same manner used by the second step to deposit and consolidate the inner soot. Alternatively, the first step may deposit and/or consolidate the soot on the inner surface using a method different from that used by the second step to deposit and/or consolidate soot on the inner surface.

An example first step according to this variation includes a step (A), which traverses the plasma flame along the starting tube while injecting CFIT chemicals into the void. The traversing is at a rate E1. The rate E1 is such that the plasma flame etches the outside surface of the starter tube and causes silica soot particles to be deposited downstream of the hot zone within the tube, and consolidates the soot particles into a vitreous silica layer. At the completion of step (A), the starter tube is thinner, and there is a thin new tube of vitreous silica formed on the inside of the starter tube. Step (A) is repeated until the starting tube is etched away. The new tube consists of the repeated layers of vitreous silica deposited and consolidated as the plasma was traversed to etch the starter tube away.

In view of the above-identified and other shortcomings in the prior art, an object of the present invention is an apparatus and method for high rate production of optical fiber preforms.

Another object of the invention is an apparatus and method for high rate production of large diameter optical preforms.

Still another object of this invention is a method and apparatus for high rate production of optical fiber preforms eliminating one or more of the steps of consolidation, sintering, and jacketing used in the methods known in the art.

Another object of this invention is a method for increasing the incorporation of dopants inside a tubular member, together with increasing the processing rate.

These and other objects, features and advantages of the present invention will become more apparent to, and better understood by, those skilled in the relevant art from the following more detailed description of the preferred embodiments of the invention taken with reference to the accompanying drawings, in which like features are identified by like reference numerals.

DETAILED DESCRIPTION OF THE INVENTION

1. Definitions

For purposes of this description, the following definitions shall govern except where otherwise stated or where it is clear from the context that a meaning commensurate with that context applies:

"selectively doped" includes a range extending from a zero doping concentration up to any concentration of any dopant, giving "dopant" the meaning according to the term's ordinary and customary usage in the fiberoptic arts;

"on", with respect to an outer surface of a tubular member includes both a positional relation that is in contact with and that is spaced outward radially from the outer surface with respect to the longitudinal center axis of the tubular member; and "on", with respect to an inner surface of a tubular member includes both a positional relation that is in contact with and that is spaced inward radially from the inner surface with respect to the longitudinal center axis of the tubular member.

2. Description

Figure 1:
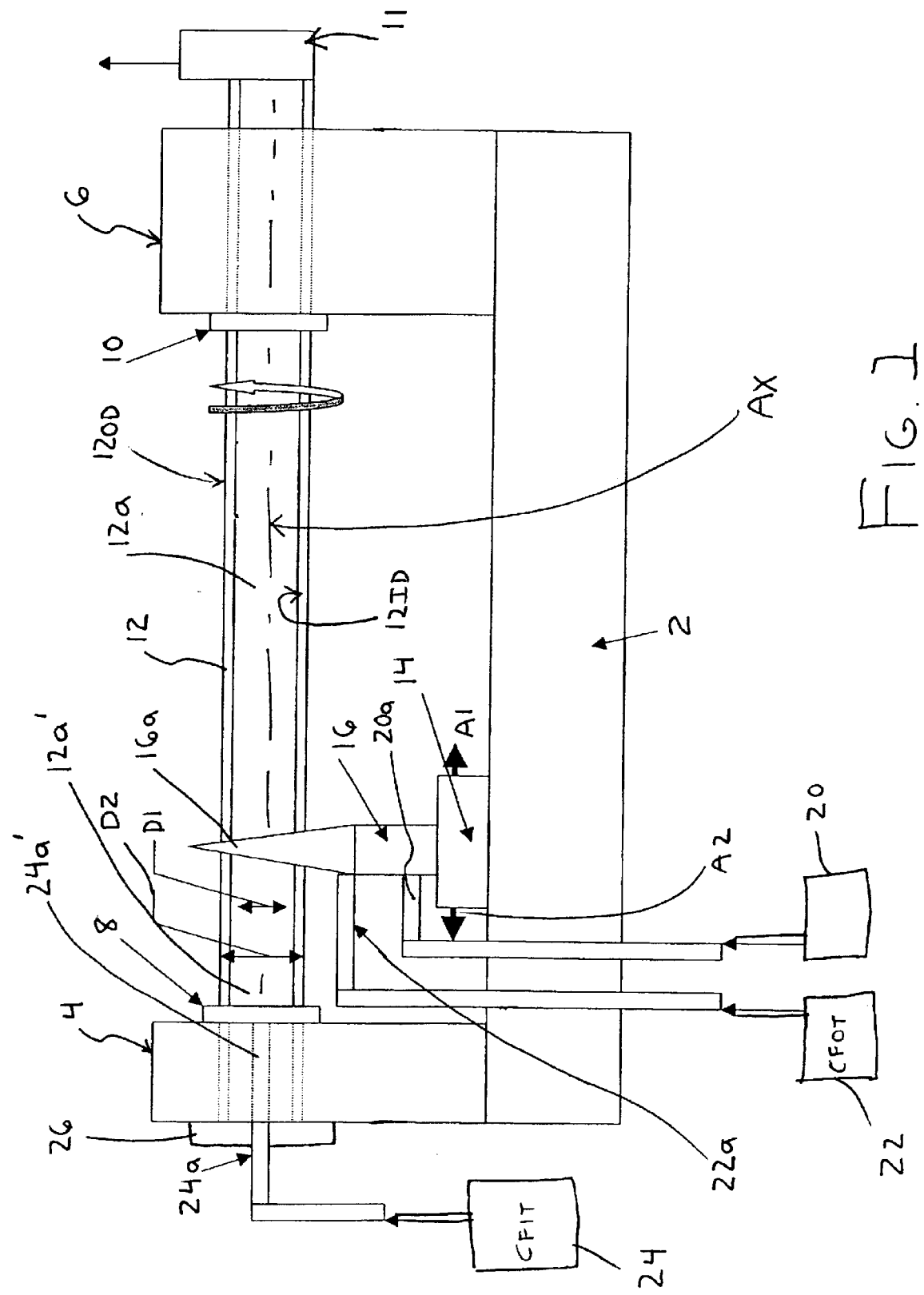
FIG. 1 is a side projection view of an assembled anchoring apparatus according to the present invention.

FIG. 1 shows an example apparatus on which the described methods and aspects of methods of this invention may be carried out. The example apparatus depicted by FIG. 1 includes a glass-working lathe 2 such as, for example, a Model T3080 available from the vendor Herbert Arnold GmbH & Co., KG, of Germany. The example glass working lathe 2 includes a headstock 4, a tailstock 6, a headstock spindle 8 and a tailstock spindle 10. The headstock spindle 8 is supported by bearings (not shown) within the headstock 4 to be rotatable about the AX axis. Likewise, the tailstock spindle 10 is supported by bearings (not shown) within the tailstock 6 so that it is rotatable about the same AX axis. A tubular member 12 passes through and is supported by the headstock spindle 8 and the tailstock spindle 10. The tubular member is clamped to each of the headstock 8 and tailstock 10 by a chuck or clamping apparatus (not shown). Such apparatus are known to persons skilled in the art to which this invention pertains. The tubular member 12 extends through the headstock spindle 8, through the tailstock spindle 10, through a bore (not shown) in the tailstock 6, to an exhaust 11. The exhaust 11 routes gasses from the hollow 12a of the tubular member 12 to an exterior location.

An electric motor and shaft (not shown) apply rotational force directly to both of the headstock 8 and tailstock 10. The rate R at which the spindles 8 and 10 and, hence, the tubular member 12, are rotated is referenced herein in rotations-per-minute (RPM), is selectable, as known in the art.

The example glassworking lathe 2 further includes a carriage 14 which moves by a carriage translation mechanism (not shown) in the A1 and A2 direction. The directions A1 and A2 are opposite from one another and parallel to the A axis. A high frequency plasma isothermal torch 16 is mounted to the carriage 14. An example high frequency plasma isothermal torch 16 is described in U.S. Pat. No. 6,253,580 ("the '580 patent"), and the entire disclosure of the '580 patent is hereby incorporated by reference. Power for the plasma isothermal torch 16 is supplied by a high frequency (HF) radio wave generator (not shown), which may be an off-the-shelf unit. An example that is usable as the generator for the torch 16 is Model IG 120/3000, available from the vendor Huttenger Elektronik GmbH & Co., of Germany, or an equivalent commercially available unit.

The FIG. 1 glassworking lathe 2 described above moves the plasma torch 16 in the A1 and A2 directions by supporting the torch 16 on a carriage 14 movable along lathe ways (not shown). An alternative embodiment (not shown), employs a fixed carriage (not shown) and a headstock (not shown) and tailstock (not shown) movable in unison in the A1 and A2 directions. Vendors such as, for example, Herbert Arnold GmbH & Co., KG, of Germany provide glassworking lathes having a fixed carriage, a movable headstock and tailstock, and a mechanism for moving the headstock and tailstock in unison. A primary advantage of a glassworking lathe having a fixed headstock and fixed tailstock, with a moving carriage 14, is size. Disadvantages, many of which have site-specific weight, include short structural life and/or high repair rates on the movement mechanism (not shown) for the carriage 14. Another disadvantage is that it is typically difficult to connect environmental containment structures to a moving carriage.

FIG. 1 shows an example plasma 16a generated by the plasma torch 16. The plasma 16a has a frequency based (not labeled) in part on the particular CFIT and/or CFOT being used and, therefore, may differ for each of the respective steps described herein. The operating frequency of the HF generator is defined by the plasma frequency. The frequency selection and the operating frequency of the HF generator are readily performed using the criteria and selection guidelines from the prior art of POVD. The temperature profile of the plasma 16a is set by methods known in the POVD arts, typically including varying the anode (not shown) voltage, or the anode current (not shown) of the HF generator triode (not shown). The spacing between the plasma torch 16 and, hence, the plasma 16a, and the tubular member 12 is controllable by, for example, a movable support stand (not shown) which moves the plasma torch 16 in a direction perpendicular to the AX axis, in response to a control signal (not shown) generated by a distance sensing device such as, for example, an ultrasonic distance sensor (not shown) or a charge coupled device (CCD) camera (not shown) using frame grabbing software. Examples of a suitable CCD camera include a Pulnix™ TM-1-1 and a Kodak™ ES 1.0.

Referring to FIG. 1, the depicted example apparatus for performing the methods described herein, and variations of each, further includes a gas reservoir, or source 20, which provides plasma gasses (not labeled) to the plasma torch 16, and a first chemical reservoir, or CFOT source 22, which provides plasma deposition and/or dopant chemicals (not labeled) for injection into the plasma torch 16. The FIG. 1 apparatus also includes a second chemical reservoir or CFIT source 24 providing deposition and/or dopant chemicals for injection into the hollow or void 12a of the tubular member 12. Each of the reservoirs 22 and 24, as will be understood from the detailed description of the methods below, preferably includes a plurality of smaller reservoirs or sources (not shown), each having a flow control (not shown). This facilitates selection and varying of the mixture of chemicals constituting the CFOT chemicals for injection into the plasma and the CFIT chemicals for injection into the hollow 12a of the tubular member 12. The flow controls (not shown) may be commercially available units (not shown), available from a number of suppliers, which are well known to persons skilled in the art to which this invention relates.

A first connection line 20a provides a flow path from the gas reservoir, or source 20, to the base of the coil (not shown in FIG. 1) of the plasma torch 16, as described by the '580 patent, and a second connection line 22a provides a flow path from the first chemical reservoir or source 22 to the injection ports (not shown in FIG. 1) of the torch 16, as also described by the '580 patent. Flow controls (not shown) are included in each of the connection lines 20a and 22a. Similarly, a third connection line 24a provides a flow path from the second chemical reservoir or source 24 to the hollow 12a of the tubular member 12. As shown, the example third connection line 24a includes a distal portion 24a' extending into one end 12a' of the hollow 12a of the tubular member 12, exiting substantial coincident with the position of the headstock spindle 6. A support structure 26 is attached, as shown in the FIG. 1 example, to the headstock 4, to support the distal portion 24a' at a position substantially centered within the end 12a' of the hollow.

The plasma torch 16 will be used for all of the deposition, consolidation and collapsing steps described herein. The described steps include simultaneously depositing soot on the inner and outer surfaces of the tubular member, and consolidating one or both of the inner and outer soot concurrent with the deposition. The deposition and consolidation of soot on the outer surface is a POVD process as described in the '580 patent. The deposition and/or consolidation on the inner surface of the silica tube is achieved by flowing the CFIT chemicals through the tube as the plasma deposits the outer soot. The heat transfer to the interior of the tube is then exploited by the presence of the CFIT chemicals, which react to deposit soot, and/or consolidate the deposited soot, as well as consolidate soot deposited in previous passes. Whether or not the soot is deposited on the inner and outer surfaces of the tubular member, for a particular pass of the plasma, is determined and controlled by switching the flow of the CFOT and CFIT chemicals as the plasma torch is traversed. Further, the soot may be consolidated as it is being deposited, or may just be deposited without consolidation, for consolidation by a subsequent pass of the plasma flame. Whether or not the soot is consolidated is determined by the traversal rate of the plasma torch, together with the rotational rate of the tubular member and the temperature profile of the plasma flame. Further, the overall deposition rate is increased by simultaneous deposition during a forward pass of the plasma torch, where "forward" means in the direction that the CFIT chemicals flow through the hollow of the tubular member, and by selective, and simultaneous, deposition and consolidation during the reverse traversal.

It is preferable for all of the steps of plasma deposition, deposition/consolidation, and collapsing described herein to maintain the distance between the coil (not shown) and the exterior cylindrical surface of the tubular member as its diameter increases (deposition) or decreases (collapsing). The particular spacing to be maintained depends on site-specific factors, including the energy of the plasma and the geometry of its generating coil. With respect to deposition, since the outer diameter of the tubular member increases as silica is deposited by the methods described herein, the distance is preferably adjusted on a running basis. An example implementation is a distance-sensing device arranged to detect a distance between a reference point, such as the device itself, with respect to the plasma torch and the outer surface of the tubular member. The above-described FIG. 1 example apparatus includes such a device, and includes an actuator mechanism for moving the plasma torch toward and away from the AX axis based on the signal generated by the sensor, and a predetermined reference spacing. It will therefore be understood that, preferably, all plasma deposition and consolidation steps described herein include steps of automatically spacing the plasma torch based on the outer diameter of the tubular member. However, it will be further understood that automatic spacing is not mandatory and, in the alternative, periodic manual adjustment of the distance between the plasma torch and the tubular member can be employed.

Figure 2:
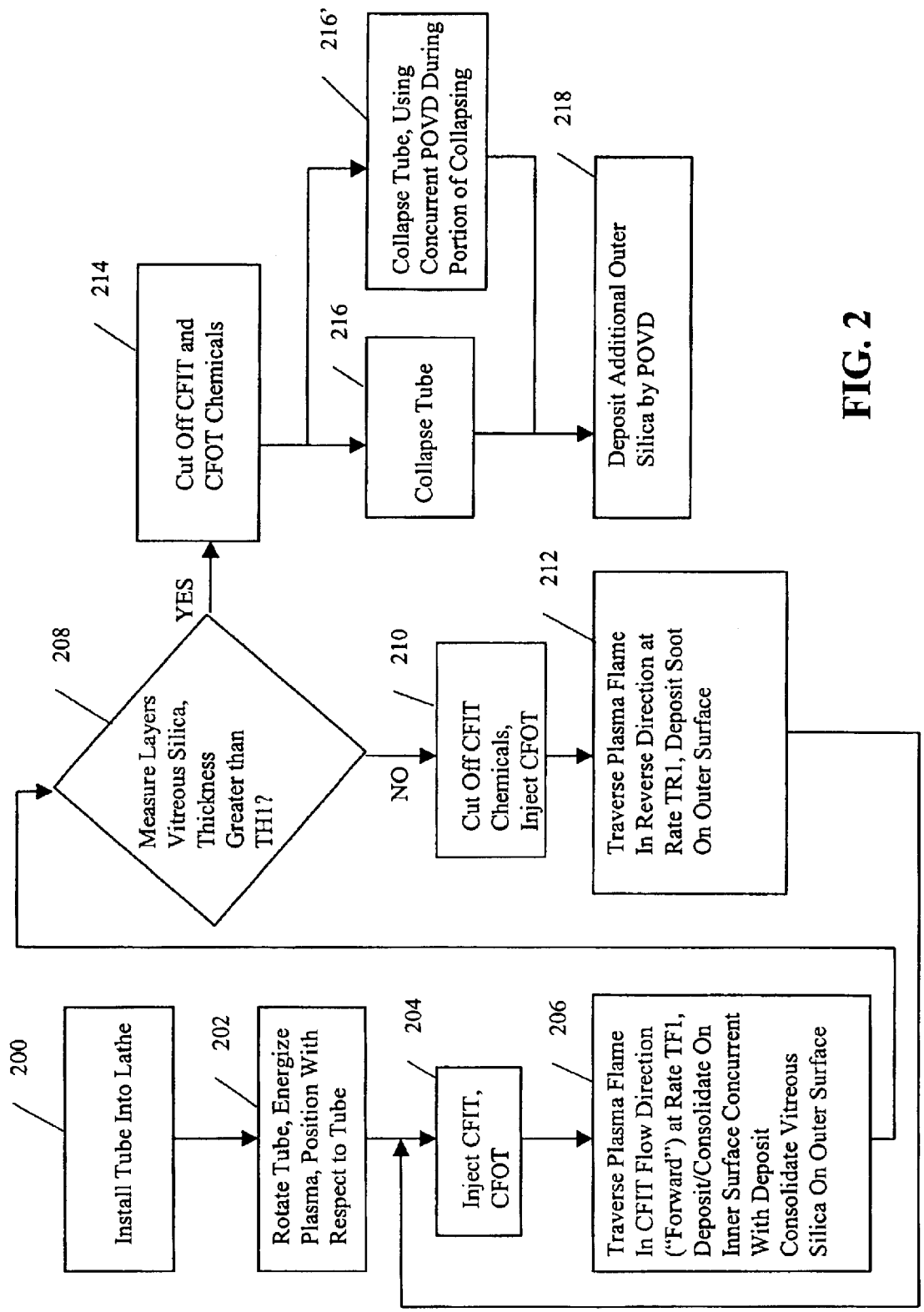
FIG. 2 shows an example step flow chart of a method according to a first aspect of the present invention.

FIG. 2 shows a first method according to this invention for making an optical fiber preform. FIG. 2 is a step flow chart showing a combination of steps and is not limited to being performed on any specific apparatus. The FIG. 2 flow chart is intended to describe and enable the method to be carried out on any apparatus constructed to perform each of the steps, of which FIG. 1 is an example. To assist in understanding the invention, however, an example operation of the FIG. 2 method will be described in reference to the FIG. 1 apparatus.

Block 200 represents the task of installing a tubular member such as item 12 of FIG. 1 into an apparatus such as the FIG. 1 lathe 2. As described above, the tubular member 12 has a cylindrical hollow or void 12a having a diameter shown in FIG. 1 as D1, and has an outer diameter shown as D2. The starting value of D1 is referenced as D1init, and the starting value of D2 is referenced as D2init. Step 202 rotates the tubular member 12 at R rotations-per-minute (RPM) about the A axis. An example D2init is 57 millimeters, plus or minus 10 millimeters, and a corresponding example R is 60 RPM plus or minus 10 RPM. The R rotation rate may be used throughout the deposition process described herein and, therefore, unless stated otherwise, it will be understood that the rotation rate R is the R rate. Also at step 202 a plasma, such as the plasma 16a of FIG. 1, is generated from a coil (not shown in FIG. 1) located within a plasma torch such as item 16. As described above, the plasma torch 16 may be in accordance with the plasma torch disclosed by the '580 patent.

Referring to the example apparatus shown by FIG. 1, the flow of plasma gasses is effected by switching the flow control (not shown) of the plasma gas reservoir 20. The plasma gasses for this example are a mixture of oxygen and nitrogen, with argon or helium for improved controllability of the temperature profile of the plasma flame. Further at step 202 the coil (not shown) is spaced a distance (not shown) from the exterior cylindrical surface of the tubular member, as part of establishing a predetermined temperature profile. An example spacing value is approximately 5 centimeters, but other spacing may be used depending on the specific structure of and power setting of the plasma torch.

Referring to FIG. 2, at step 204, a flow of CFOT chemicals, for outside vapor deposition, is started into the plasma as described by, for example, the '580 patent. For the example apparatus shown by FIG. 1, the flow of CFOT chemicals is effected by switching the flow control (not shown) of the CFOT chemical source or reservoir 22, causing the flow through the flow path 22a and into the injection nozzles (not shown in FIG. 1) of the torch 16. Example CFOT chemicals include $SiCl_4$ for the base glass component, a carrier of $O_2$, $SF_6$ for decreasing the index of refraction, and/or $TiCl_4$ for increasing the index of refraction and also improving the mechanical strength of the fiber.

Also at step 204, a flow of CFIT chemicals is started into the hollow or void 12a of the rotating tubular member 12 in a first direction, labeled A1. For this description, the term "forward," with respect to the direction of the plasma torch 16 along the AX axis, means the direction in which the CFIT chemicals flow through the void 12a. For the FIG. 1 example, "forward" is from the headstock 4, where the CFIT chemicals are injected, to the tailstock 6.

The CFIT chemicals for step 204 include $SiCl_4$ as the base glass component for the deposition, and one or more from among $GeCl_4$ and $POCl_3$, to increase the index of refraction of the silica, and $SF_6$, $SiF_4$, $CF_4$ and $BCl_3$ to decrease the index of refraction, with $O_2$ as the carrier gas. When these CFIT chemicals reach the hot zone of the plasma a chemical reaction takes place. The chemical reaction will form soot particles of silica or doped silica, depending on the specific chemicals used, and the particles will flow with the carrier gas in the same direction and deposit downstream on the interior surface of the tubular member.

Referring to FIG. 1, the starting position of the plasma torch 16 is toward the headstock 8, which supports the end 12a' of the tubular member 12 into which the CFIT chemicals are input by the distal end 24a' of the flow path 24a.

Next, at step 206, the plasma torch 16 (and the plasma 16a) is traversed in the forward direction at a first forward traversal rate TF1. An example value of TF1, assuming an outer diameter D2init of 57 millimeters and a rotational rate R of 60 RPM, is 20 centimeters-per-minute. As the plasma 16a with the CFOT chemicals traverses down the tubular member 12, a layer of outer soot particles is deposited and consolidated into an outer layer of vitreous silica on the moving area (not numbered) of the outer surface 12OD on which the plasma is incident. Simultaneous to the described formation of an outer layer of vitreous silica, inner silica soot particles are deposited on the inner surface 12ID and consolidated into an inner layer of vitreous silica in accordance with the CFIT chemicals.

The first forward traversal rate TF1 is selected in accordance with the rotation rate R and the temperature profile of the plasma flame such that the temperature at the outside surface of the tube and the opposite surface inside of the tube is sufficient to consolidate the respective deposited soot particles. Therefore, upon completion of the single step 206 forward pass, an inner layer of vitreous silica in accordance with the CFIT chemicals and an outer layer of vitreous silica in accordance with CFOT chemicals is formed on substantially the entire length of the tubular member 12 extending from the headstock spindle 8 to the tailstock spindle 10.

Next, at step 208, the total thickness of doped vitreous silica deposited on the interior surface 12ID is measured. The step 208 measurement may be performed by measuring the wall thickness of the tubular member, preferably by a non-contact method such as, for example, an optical gauge (not shown) or ultrasound (not shown) Contemplated optical gauges include, but are not limited to an off-the-shelf BenchMike™ available from the vendor Beta LaserMike.

If the thickness is less than a predetermined value, labeled for reference as TH1, the process goes to step 210, and terminates the step 204 flow CFIT chemicals into the void 12a. The flow is terminated using, for example, commercially available flow control devices (not shown) within the first and second chemical reservoirs, or sources, 22 and 24. The flow of CFOT chemicals is maintained. Then, at step 212, the plasma torch 16 is traversed, at a first reverse traversal rate TR1, in the reverse direction, labeled on the FIG. 1 example apparatus as A2. The reversal traversal TR1 rate is set at a value such that the temperature profile of the plasma deposits an outer layer of silica soot particles in accordance with the CFOT chemicals, but does not consolidate the particles. The rate TR1 that will effect deposition of outer silica particles but not consolidation is typically higher than the traversal rate for simultaneous deposition/consolidation. For example, using the rotation rate R of 60 RPM, a TR1 of 40 centimeters-per-minute was observed as obtaining the step 210 desired deposition of the outer soot layer. This is significantly higher than the step 206 traversal rate TF1 of 20 centimeters-per-minute.

Because the flow of the CFIT chemicals into the void 12a is cut off during step 210, there is no substantial additional deposition of soot on the interior surface 12ID at the step's completion.

The process then returns to step 206, and deposits another inner layer and outer layer of vitreous silica, in accordance with the CFIT and CFOT chemicals, respectively. The first forward traversal rate TR1, such as the example rate of 20 centimeters-per-minute, is sufficient to consolidate the outer soot layer deposited at step 210, together with the soot then being deposited, into the outer vitreous silica layer. The measurement step 208 is also repeated.

The process of step 206 traversing the plasma torch 16 in the forward direction at rate TF1, for concurrent depositing of soot and consolidation of same on the inner surface with simultaneous deposition and consolidation of soot on the outer surface, followed by the step 208 measurement and the step 210 and 212 deposition of soot at the rate TR1 repeats until step 208 detects a thickness not less TH1. When step 208 detects a thickness not less that TH1 the process goes to step 214, which switches off the CFOT and CFIT chemicals, and then goes to step 216 which collapses the preform by traversing the plasma torch 16 back and forth.

The process may be considered complete upon completion of the step 216 collapsing. However, the process may go to step 218 and perform outside plasma vapor deposition, using the plasma torch 16 with the CFOT chemicals, until the preform reaches a desired total outside diameter.

It will be understood that the particular step breakdown shown in FIG. 2, such as steps 202, 204 and 206, is for purposes of explaining the method and its simultaneous inner and outer deposition of soot. In actual operation, steps 202 and 204, and 210 and 212 could be combined into a single, concurrent step. Likewise, in practicing the above-described method, the steps do not necessarily have to be performed in the sequence depicted by FIG. 2. For example, the step 204 switching on of the CFOT and CFIT chemicals could precede the start of the rotation of the tubular member labeled as step 202.

It will be further understood that the measurement step 208 could be performed periodically with respect to the forward deposition/consolidation of step 206, instead of being performed after each completion of that step.

Referring to block 216', a variation of the above-described example of the invention performs plasma outside vapor deposition (POVD) during a portion of the collapsing step. The step 216' POVD performs this operation by, for example, injecting CFOT chemicals into the plasma during the collapsing operation. It is preferable, because of the importance of maintaining parameters of the heat and pressure during the collapsing step 216, and 216', that step 216' not perform POVD during the late stage of the collapsing operation.

It will be further understood that the novel aspects of the present invention could be carried out with the elimination of steps 210 and 212, and using only the forward passes of steps 204 and 206. Although this would reduce the production rate, by removing the deposition function of the plasma while retracing back to the starting point at the end of each pass of step 206, such an implementation may be usable in certain circumstances.

Figure 3:
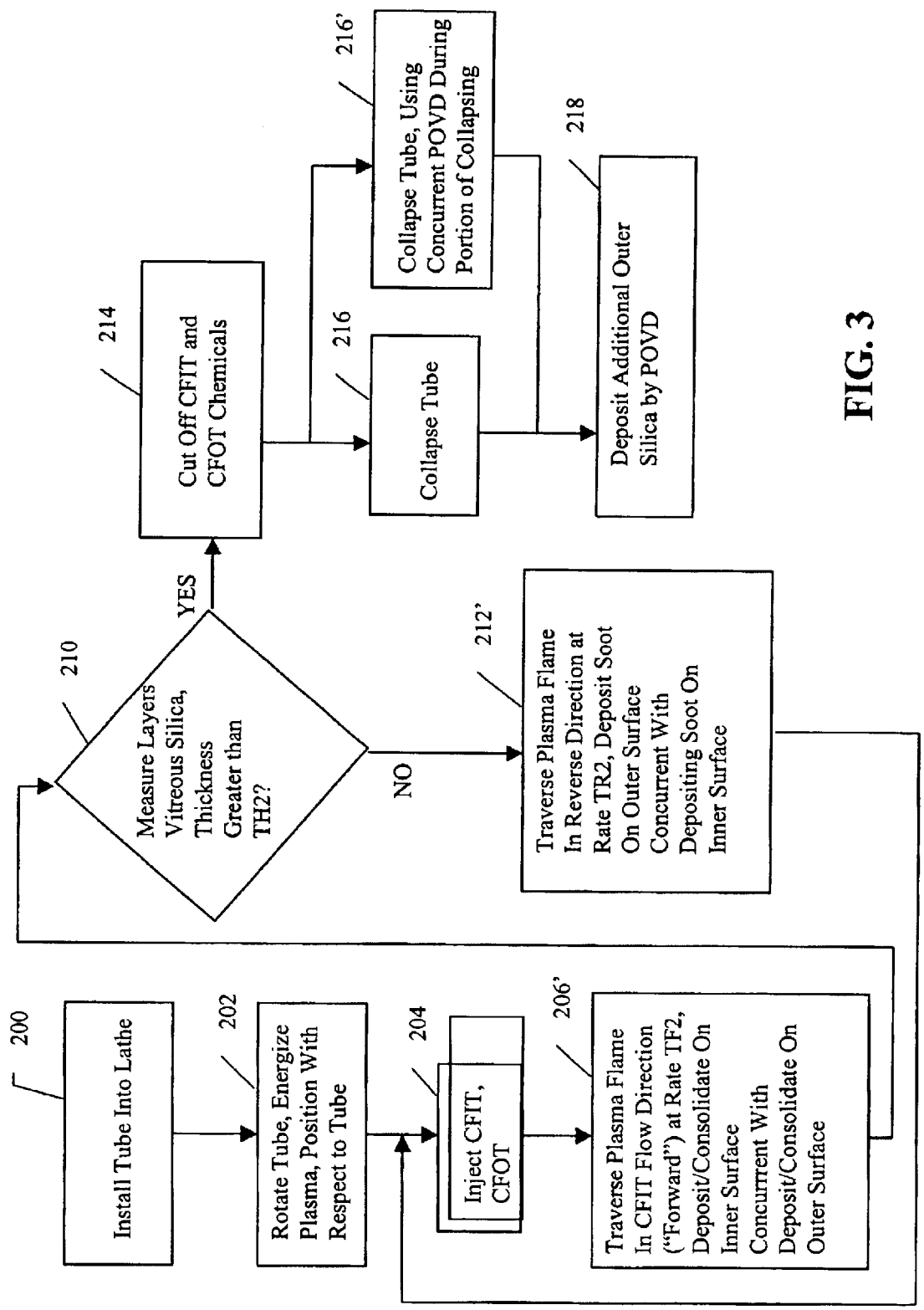
FIG. 3 shows an example step flow chart of a method according to a second aspect of the present invention.

FIG. 3 shows an example step flow chart of another simultaneous deposition method according to this invention. The method shown by the example flow chart of FIG. 3 is similar to the method described above in reference to FIG. 2, but maintains the flow of CFIT chemicals during the reverse-direction pass of step 212. FIG. 3 is therefore identical to FIG. 2, except that the step 210 cutting off of the CFIT chemicals is eliminated, and step 212 is replaced by step 212', and step 206 is replaced by step 206'. Step 212' differs from step 212 of FIG. 2 in that a layer of silica soot, in accordance with the CFIT chemicals, is deposited on the inner surface of the tubular member, concurrent with the outer layer of silica soot deposited as in step 212. Likewise, step 206' of FIG. 3 differs from step 202 of FIG. 2 as the forward pass at rate TF2 consolidates the inner soot layer deposited by the last iteration of step 212', in addition to depositing and consolidating a new inner vitreous silica layer as step 206 is described as performing.

The forward traversal rate for step 206' is labeled TF2 and the reverse traversal rate is labeled TR2, for purposes of reference. However, depending on design choice and site-specific physical parameters, the FIG. 3 step 206' forward traversal rate TF2 may be the same as the FIG. 2 step 206 rate TF1. Likewise, the FIG. 3 step 212' reverse traversal rate TR2 may be the same as the FIG. 2 step 212 reverse traversal rate TR1.

The method illustrated by the example flow chart of FIG. 3 has a higher deposition rate with respect to inner silica layers as compared to the FIG. 2 method. This method is particularly suitable for making a single mode preform, because a single mode fiber typically has a relatively simple design for its index of refraction profile. More particularly, a single mode preform typically does not require a significant plurality of changes in cross-sectional dopant concentration, and typically does not use a high dopant concentration. Further, the method of illustrated by the FIG. 3 flow chart has a high process rate. The decreasing selling price of single mode fiber increases the benefit of the higher processing rate.

Figure 4:
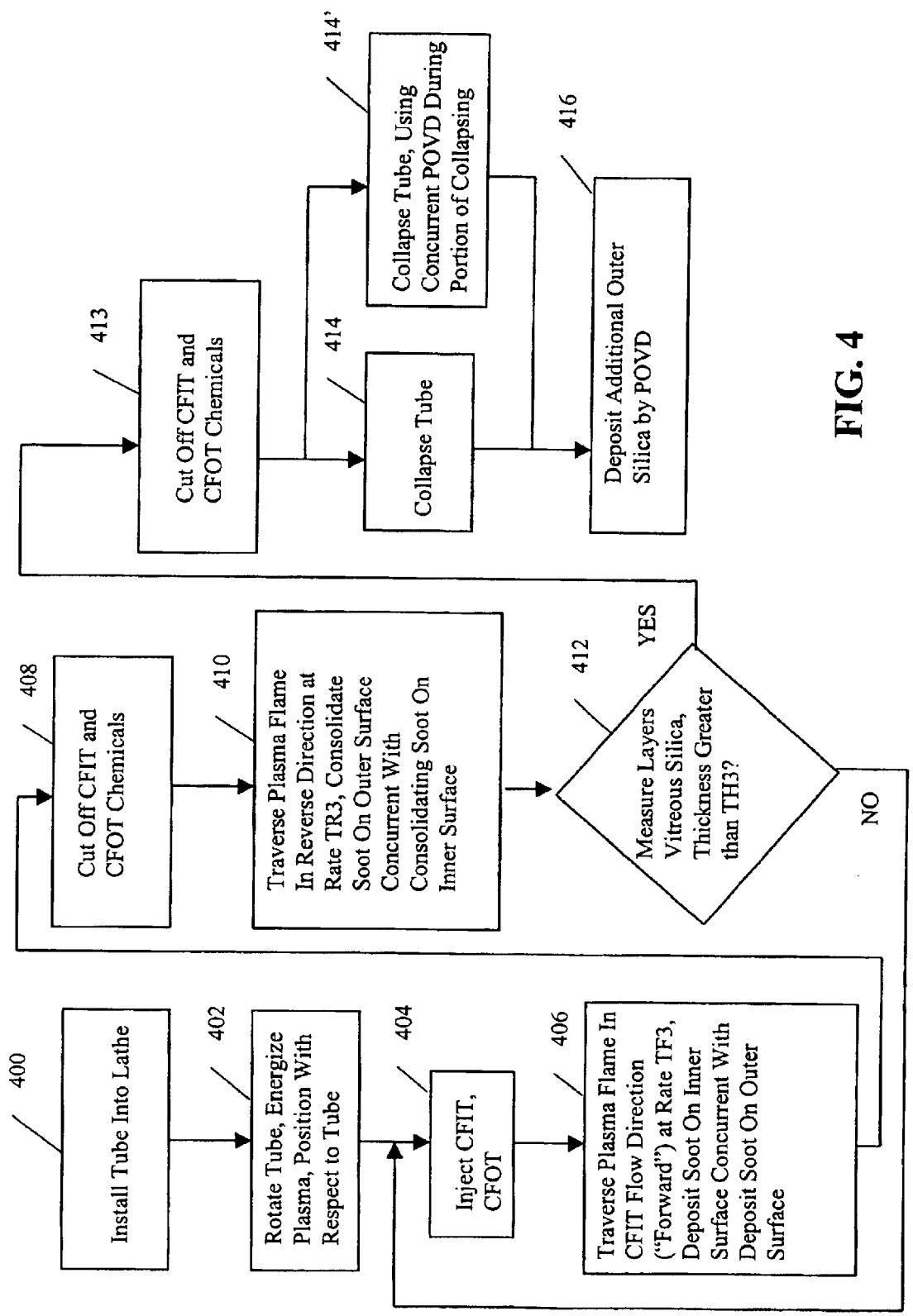
FIG. 4 shows an example step flow chart of a method according to a third aspect of the present invention.

FIG. 4 shows a step flow chart of another simultaneous deposition method according to this invention. Block 400, is identical to blocks 200 described above, representing the task of installing a tubular member such as item 12 of FIG. 1 into an apparatus such as the FIG. 1 lathe 2. Step 402 starts the plasma and spaces it to have a predetermined temperature profile relative to the initial outer surface of the tubular member.

Next, at step 404, a flow of CFOT chemicals is started into the plasma torch as described by, for example, the '580 patent, and a flow of CFIT chemicals is started into the hollow or void 12a of the rotating tubular member 12. The method next goes to step 406, which traverses the plasma torch in the forward direction at a rate TF3 where, as described above, "forward" means in the direction that the CFIT chemicals flow through the hollow or void of the tubular member. The plasma torch then traverses along the tubular member at rate TF3 which, using the example apparatus of FIG. 1, is toward the tailstock 6. The rate TF3 is selected, based on the rotation rate R and the temperature profile of the plasma 16a, such that the heat of plasma only deposits, without substantial consolidation, a soot layer on both the inside and outside surfaces of the tubular member. This differs from the forward pass step 206 of the method of FIG. 2, and step 206' of FIG. 3, each of which performs, concurrently, deposition and consolidation on both the inner surface and the outer surface of the tubular member. An example value of TF3 is 40 centimeters-per-minute.

Upon completion of the step 406 forward pass a layer of soot is deposited on the inside and outside of the tubular member, along a length such as, referring to FIG. 1, the span between the headstock spindle 8 and the tailstock spindle 10. The process then goes to step 408, which terminates the flow of both the CFOT chemicals to the plasma torch and the CFIT chemicals to the hollow or void of the tubular member. Then, at step 410, the plasma torch 16 is traversed, at a third reverse traversal rate TR3, in the reverse direction, to consolidate the inner and outer soot layers into layers of vitreous silica. An example value of TR3 is 20 centimeters-per-minute.

Next, step 412 detects the total thickness of the vitreous silica layers deposited on the inner surface of the tubular member. If the total thickness is less than a threshold TH3, the process goes back to step 404 which restarts the flow of the CFOT chemicals into the plasma torch and the CFIT chemicals into the hollow or void 12a. The process then goes to step 406 to traverse the plasma torch in the forward direction and deposit another layer of soot on the inside and outside of the tubular member, and then to steps 408 and 410 to consolidate the soot layers into vitreous silica.

If step 412 detects the total thickness of vitreous silica deposited on the inner surface of the tubular member as not less than TH3, the process goes to step 413, cuts off CFIT and CFOT chemicals, then goes to step 414 which collapses the preform by traversing the plasma torch back and forth. The process may be considered complete upon completion of the step 414 collapsing.

A further aspect of the method according to FIG. 4 is shown as 414' which performs the collapsing step described for step 414, and which additionally injects CFOT chemicals into the plasma during at least a portion of the collapsing operation. Step 414' therefore deposits soot and consolidates it into additional vitreous silica while the tubular member is being collapsed. Because the heat must be controlled more carefully during the latter stages of the collapsing operation, particularly during the last pass before close off and the close-off steps, the CFOT chemicals are preferably terminated at that time.

A still further aspect of the method according to FIG. 4 is shown as step 416, which performs POVD on the collapsed preform generated at step 414 as, for example, is described in the '508 patent.

The method represented by the example flow chart of FIG. 4 is particularly suitable for making a multimode preform. A significant reason is that in the forward traversal direction, i.e., step 406, the traversal rate keeps the temperature such that only deposition of soot, without substantial consolidation, takes place. This lower temperature favors chemical reaction of, and enhances the incorporation of dopants such as $GeO_2$.

Figure 5:
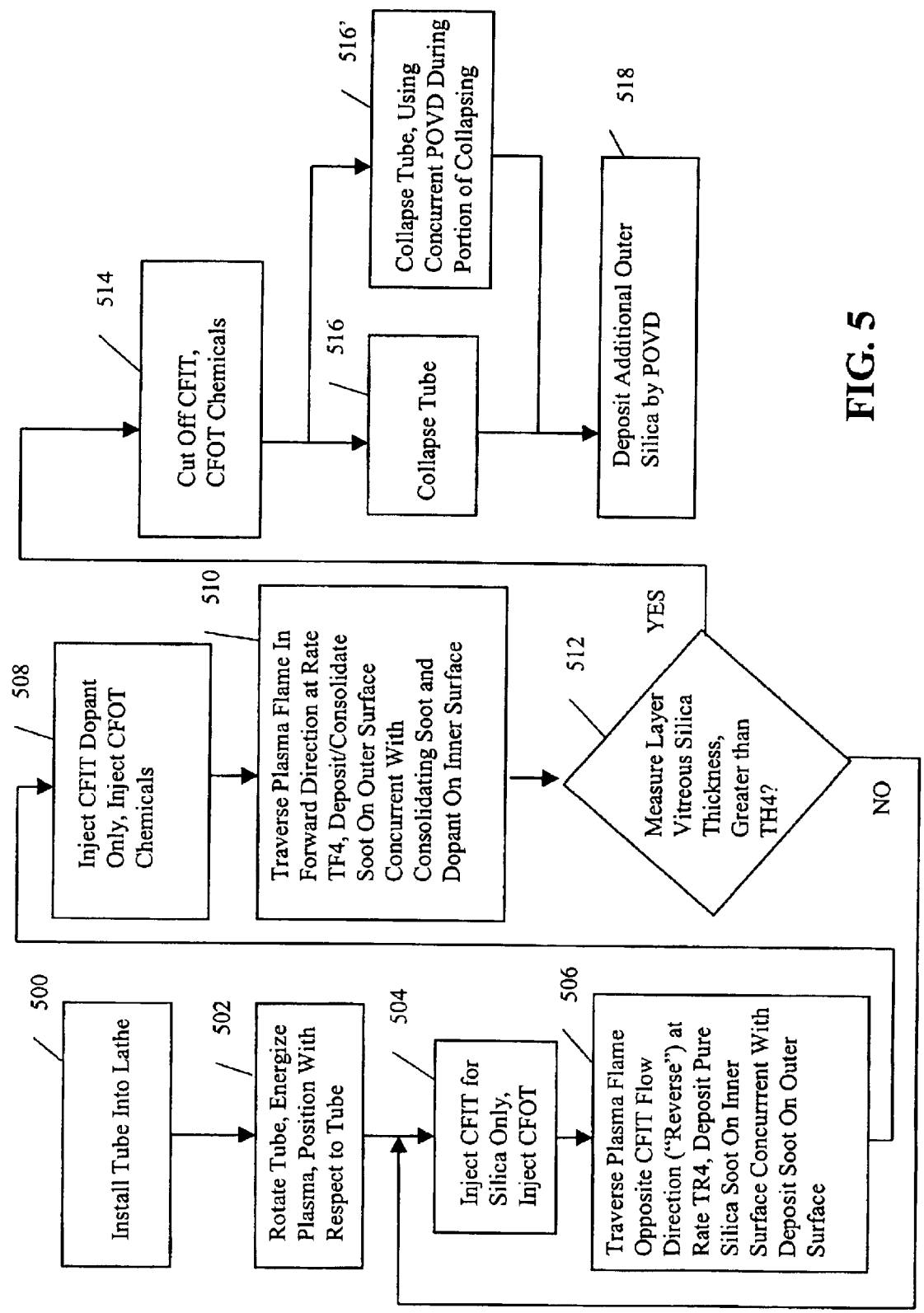
FIG. 5 shows an example step flow chart of a method according to a fourth aspect of the present invention.

FIG. 5 shows a step flow chart of still another simultaneous deposition method according to this invention. Block 500 represents the task of installing a tubular member such as item 12 of FIG. 1 into an apparatus such as the FIG. 1 lathe 2. Step 502 starts the rotation of the tubular member at rate R, starts the plasma and spaces it to have a predetermined temperature profile relative to the initial outer surface of the tubular member. An example value of R is 60 RPM, and an example spacing is approximately 5 centimeters.

Next, at step 504, a flow of CFOT chemicals is started into the plasma torch as described by, for example, the '580 patent, and a flow of CFIT chemicals is started into the hollow or void 12a of the rotating tubular member 12. The CFIT chemicals are those which promote formation of only substantially pure silica soot. The FIG. 5 method then goes to step 506, which traverses the plasma torch in the reverse direction at a fourth reverse traversal rate TR4. As described above, "forward" and "reverse" mean, respectively, in the direction that the CFIT chemicals flow through the hollow or void of the tubular member and opposite that direction. Using the example apparatus of FIG. 1 "reverse" is away from the tailstock 6.

The rate TR4 is selected, based on the rotation rate R and the temperature profile of the plasma, such that during step 506 the heat of the plasma flame 16a deposits a layer of substantially pure silica soot on the inside surface of the tubular member and a layer of silica soot on the outside surface, doped in accordance with the CFOT chemicals. The rate TR4 must be such that there is no substantial consolidation of the inner soot layer of substantially pure silica. The reason is that step 510, described below, injects a CFIT having dopant chemicals, such as $GeCl_4$, while consolidating the soot and the dopant into a vitreous silica layer doped, for the $GeCl_4$ example, by germanium. If the substantially pure silica soot deposited at step 506 is consolidated the dopant injected at step 510 may not adequately diffuse into the silica.

After step 506 the method goes to step 508, where the CFIT chemicals are changed such that the chemicals causing formation of silica soot are cut-off, or sent to a vent (not shown), and only the chemicals that modify the index of refraction of the to-be consolidated inner soot layer, such as $GeCl_4$, are included. The process then goes to step 510 which traverses the plasma flame 16a along the tubular member in the forward direction, at a fourth forward traversal rate TF4. The traversal rate TF4 is such that the plasma flame 16a heat consolidates the substantially pure silica soot inner layer deposited at step 506 with the CFIT chemicals modifying the index of refraction to form an inner vitreous silica layer selectively doped in accordance with the CFIT chemicals. Concurrent with forming the inner vitreous doped silica layer, the plasma 16a deposits additional silica soot above the outer surface of the tubular member and, at the same time, consolidates that soot and the outer soot deposited at step 506 into an outer layer of vitreous silica, doped in accordance with the CFOT chemicals. The fourth forward traversal rate TF4 is typically lower than the fourth reverse traversal rate TR4.

At the completion of step 510 an inner vitreous silica layer is formed, based on the substantially pure silica soot deposited at step 506 and the CFIT index-modifying chemicals introduced into the void at step 510, and an outer vitreous silica layer is formed, based on the soot deposited at step 506 and the soot deposited at step 510, both of which are consolidated at step 510.

After step 510, step 512 detects the total thickness of the vitreous silica layers deposited on the tubular member. If the total thickness is less than a threshold TH4, the process goes back to step 504, which changes the CFIT chemicals back to those which promote formation of only substantially pure silica soot, and traverses the plasma torch in the reverse direction at the rate TR4. This deposits another inner layer of substantially pure silica soot and an outer layer of silica soot in accordance with the CFOT chemicals. If step 510 detects the total thickness of doped vitreous silica deposited on the inner surface of the tubular member as not less than TH4, the process goes to step 512 which collapses the preform by traversing the plasma torch back and forth. The process may be considered complete upon completion of the step 512 collapsing.

A further aspect of the method according to FIG. 5 performs step 516' instead of 516. Step 516' injects CFOT chemicals into the plasma during at least a portion of the collapsing operation to deposit and consolidate additional soot into additional vitreous silica layers. As also described, it is preferable that injection of CFOT terminate during the later stages of the consolidation, to better enable control of the temperature and pressure during the final preform collapse.

A still further aspect of the method according to FIG. 5 is the step 514 performing of plasma outside vapor deposition on the collapsed preform generated at step 516 or 516' as, for example, is described in the '508 patent.

The method represented by the example flow chart of FIG. 5 is particularly suitable for making a multimode preform. It is particularly suitable in part because it provides improved incorporation of dopants such as $GeO_2$ or F. Further, the process environment inside the tubular member has good control. More particularly, the only reaction during the reverse traversal of step 506 is that of the $SiCl_4$ producing substantially pure silica soot. This allows better control over the packing density or porosity of the undoped silica soot by controlling the temperature profile of the plasma flame 16a. Moreover, the process during step 510 is limited to injection of CFIT chemicals modifying the index of refraction, and the $O_2$ and other carrier gasses, and consolidating those with the previously deposited silica, without forming additional silica soot. This allows more complete oxidation reactions for the CFIT chemicals modifying the index of refraction. The latter benefit is a significant improvement over typical MCVD processes, because these generally have excess chlorine gas inside of the tube, which makes the oxidation reaction for the dopants become thermodynamically unfavorable.

The reasons by which a method according to FIG. 5 obtains improved oxidation of dopants when compared to conventional MCVD processes include depositing pure silica soot at step 506, followed by injecting the dopants at step 510 while consolidating the soot and the dopants into a vitreous silica layer. Conventional MCVD processes inject the SiCl$_4$, to form silica soot, together with the dopants. As previously described, the result is incomplete oxidation of the dopants, with a large percentage ending up in the effluent. The FIG. 5 method, separates the reactions by injecting only SiCl$_4$ during the deposition of step 506, followed by injecting the dopant chemicals, such as GeCl$_4$, during the consolidation step 510. A still further aspect of the method according to FIG. 5 is shown as step 518, which perform POVD on the collapsed perform generated at step 516' as, for example, is described in the '508 patent.

Figure 6:
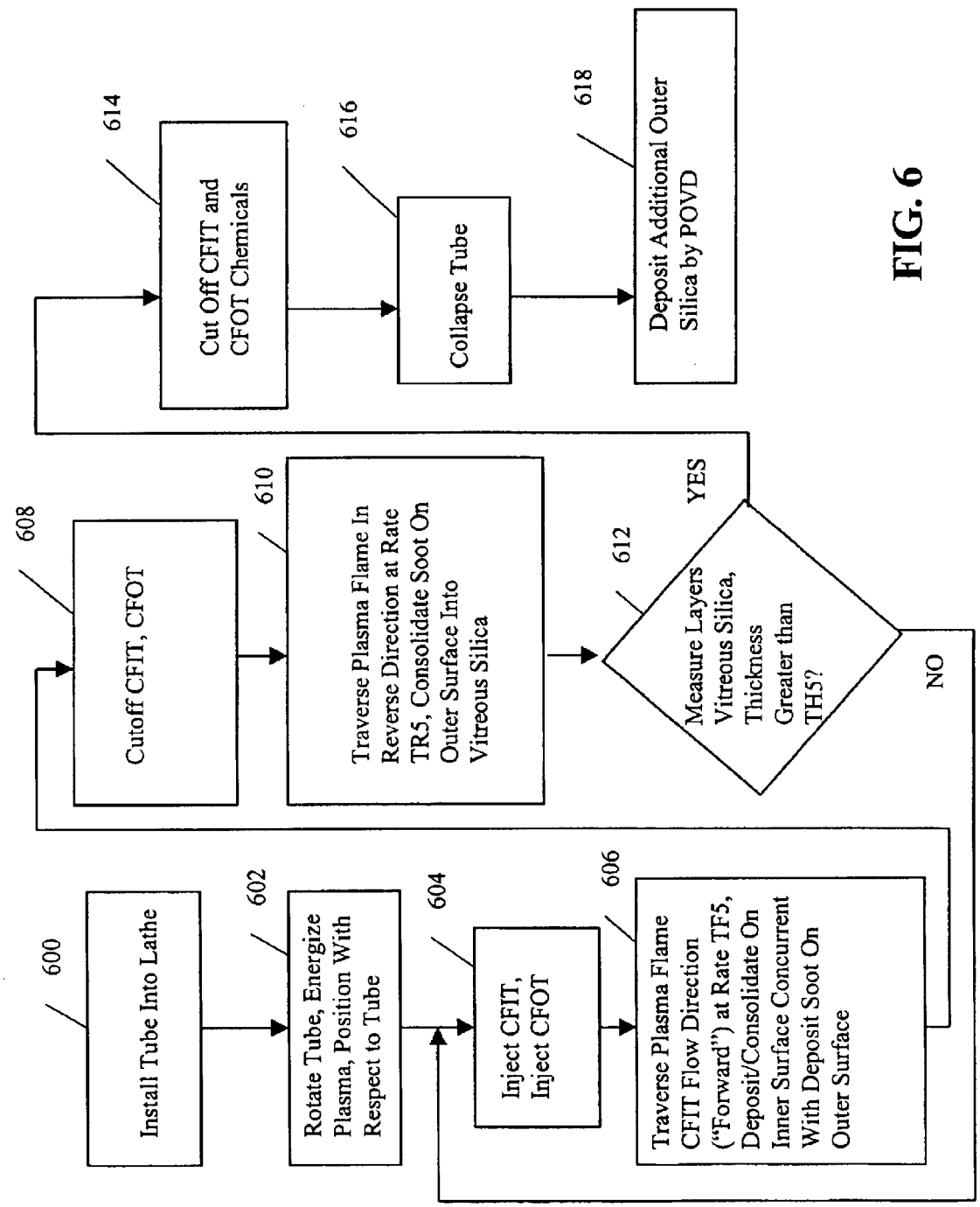
FIG. 6 shows an example step flow chart of a method according to a fifth aspect of the present invention.

FIG. 6 shows an example step flow chart of another simultaneous deposition method according to this invention. At block 600 a tubular member such as item 12 of FIG. 1 is installed into an apparatus such as the FIG. 1 lathe 2. Step 602 starts the rotation of the tubular member at rate R, starts the plasma and spaces it to have a predetermined temperature profile relative to the initial outer surface of the tubular member. An example value of R is 60 RPM, and an example spacing is approximately 5 centimeters. At step 604 a flow of CFOT chemicals, for POVD, is started into the plasma as described by, for example, the '580 patent. It is preferable that the CFOT chemicals for the POVD performed by this FIG. 6 method be selected to promote formation of substantially pure silica soot, i.e., undoped. Also at step 604, a flow of CFIT chemicals is started into the hollow or void 12$a$ of the rotating tubular member 12. It is preferable that the CFIT chemicals promote formation of silica soot and GeO$_2$ dopant. Described subsequent steps will consolidate the silica soot and the GeO$_2$ into a germanium doped vitreous silica layer.

Next, at step 606, the plasma torch 16 (and the plasma 16$a$) is traversed in the forward direction at a fifth forward traversal rate TF5. An example value of TF5, assuming an outer diameter D2init of 57 millimeters and a rotational rate of 60 RPM is 20 centimeters-per-minute. As the plasma 16$a$ with the CFOT chemicals traverses down the tubular member 12, a layer of outer soot particles is deposited on the moving area (not numbered) of the outer surface 12OD on which the plasma is incident. The rate TF5 is selected in accordance with the rotation rate R and the temperature profile of the plasma flame such that the temperature at the outside surface of the tube will be about 1800° C. and inside of the tube will be about 1500° C. This temperature is insufficient to consolidate the undoped (pure) silica layer of outer soot particles. However, the temperature within the void 12$a$ causes simultaneous deposition of GeO$_2$ doped SiO$_2$ inner soot particles on the inner surface 12ID in accordance with the CFIT chemicals, and consolidation of those GeO$_2$ doped SiO$_2$ inner soot particles into a layer of germania doped silica.

Upon completion of one step 606 forward pass of the plasma torch 16, a layer of outer soot is formed on the outer surface 12OD of the tubular member, and a layer of germania doped silica is formed on the inner surface 12ID.

Next, at step 608, the step 604 flow of the CFOT chemicals to the plasma 16$a$ and of the CFIT chemicals into the void 12$a$ is terminated. Then, at step 610, the plasma torch 16 is traversed, at a fifth reverse traversal rate TR5, in the reverse direction A2, which is the direction opposite the flow direction A1. The fifth reverse traversal rate TR5 is set such that the temperature profile of the plasma 16$a$ consolidates the outer silica soot layer deposited at step 206. Since the CFOT chemicals are cut off, and therefore no silica is deposited on the outer surface 12OD as the plasma traverses back in the A2 direction, the rate TR5 causing consolidation of the soot layer deposited but not consolidated on 12OD during step 606 is typically higher than the traversal rate TR1. For example, using the rotation rate of 60 RPM, a TR5 of 30 centimeters-per-minute was observed as obtaining the desired consolidation of the outer soot layer deposited at step 606. This is significantly higher than the step 606 traversal rate TF5 of 20 centimeters-per-second.

At the completion of step 610 there is a layer of germania doped vitreous silica formed on the inner surface 12$a$ and a layer of undoped vitreous silica formed on the outer surface 12OD.

Next, at step 612, the total thickness of germania doped vitreous silica deposited on the interior surface 12ID is measured. If the thickness is less than a threshold TH5, the step 606 traversing of the plasma torch 16 in the forward direction at the rate TF5, for concurrent depositing of soot and consolidation of same on the inner surface with simultaneous deposition of soot on the outer surface, followed by steps 608 and 610 for consolidation of the outer surface soot, are repeated. When step 612 detects a thickness not less TH5 the process goes to step 614, which switches off the CFOT and CFIT chemicals, and then goes to step 616 which collapses the preform by traversing the plasma torch 16 back and forth.

The process may be considered complete upon completion of the step 616 collapsing. However, the process may go to step 618 and perform outside plasma vapor deposition, using the plasma torch 16 with the CFOT chemicals, until the preform reaches a desired total outside diameter.

Figure 7:
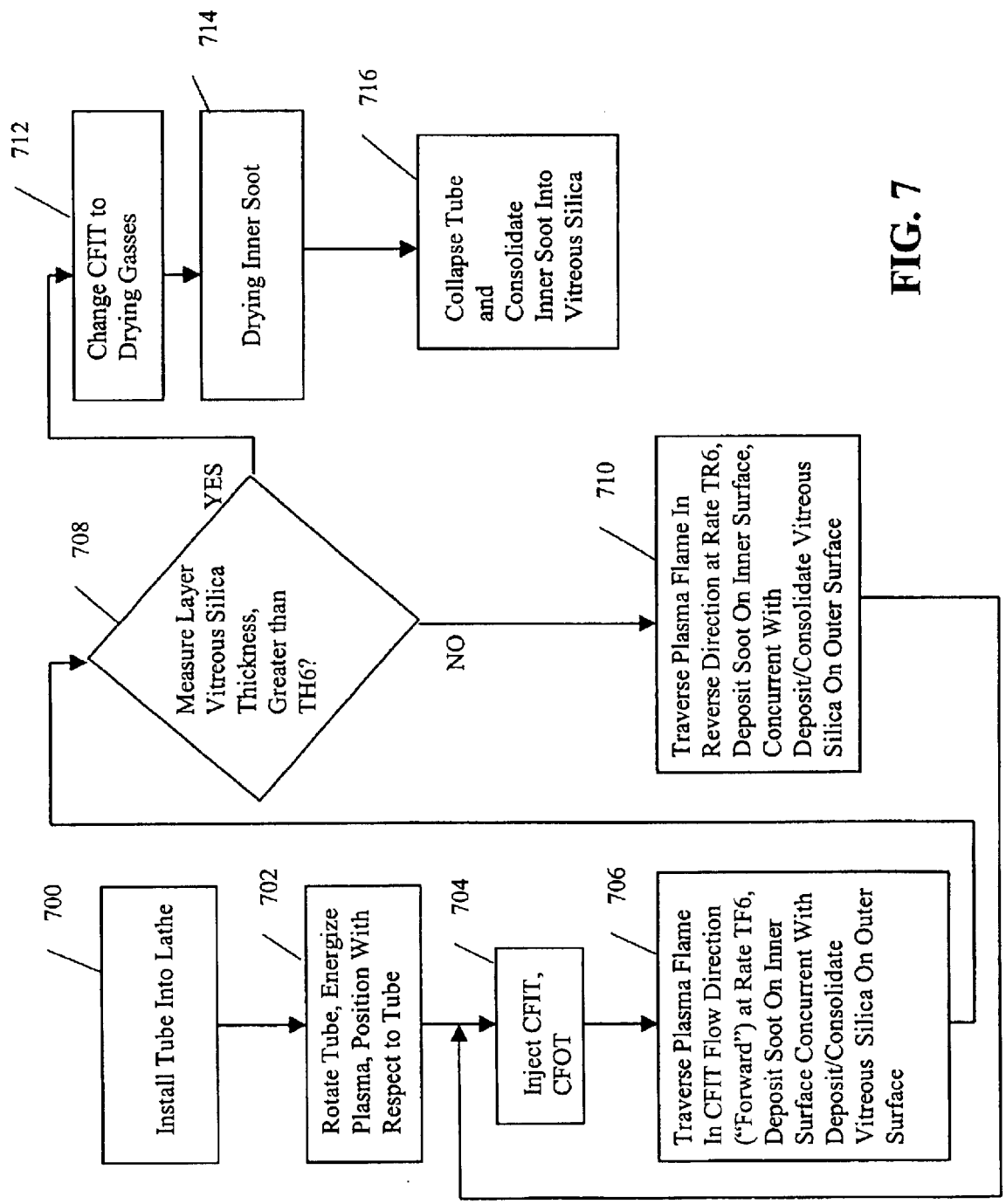
FIG. 7 shows an example step flow chart of a method according to a sixth aspect of the present invention.

FIG. 7 shows an example step flow chart of another simultaneous deposition method according to this invention. Referring to FIG. 7, the process starts at block 700 by installing a tubular member such as item 12 of FIG. 1 into an apparatus such as the FIG. 1 lathe 2. Step 702 starts the rotation of the tubular member at rate R, starts the plasma and spaces it to have a predetermined temperature profile relative to the initial outer surface of the tubular member. An example value of R is 60 RPM, and an example spacing is approximately 5 centimeters. Next, step 704 injects CFOT chemicals into the plasma flame 16$a$ and CFIT chemicals to flow into the void 12$a$ in the direction A1. The process then goes to step 706 and traverses the plasma flame 16$a$ along the tubular member in the forward direction, at a rate TF6. The rate TF6 is selected so that there is both deposition and consolidation on the outer surface of the tubular member, concurrent with deposition of soot on the inner surface. At the completion of step 706 a vitreous silica layer, doped in accordance with the CFOT chemicals, is formed on the outer surface of the tubular member and a layer of silica soot particles, with dopants in accordance with the CFIT chemicals, is deposited on the inner surface. The process then goes to step 708, traversing back along the tubular member in the A2 direction at a sixth reverse traversal rate TR6. Like the forward traversal rate TFG, the rate TR6 is selected to cause both deposition and consolidation on the outer surface of the tubular member and only deposition on the inner surface. Therefore, after completing one iteration of steps 706 and 708 there are two layers of vitreous silica formed on the outside of the tubular member and two layers of silica soot formed on the inside surface.

After completing step 708 the process goes to step 710 and measures the thickness of the deposited silica. If the measured thickness is not equal to or greater than a threshold TH6 the process returns to step 706 and then to step 708, to deposit another two layers of vitreous silica on the outside of the tubular member and another two layers of silica soot on the inside.

If step 710 measures a thickness not less than the threshold TH6 the process goes to step 712 and the CFIT is changed to a gas mixture of $O_2$, $Cl_2$ and He. These CFIT chemicals function to dry the soot deposited at steps 706 and 708. The process then goes to step 714, which traverses the plasma flame 16a at a rate T10 at least once along the length of the tubular member. The exact number of traversals that are required can be determined by analyzing the moisture content of test pieces. The present inventors observed that a single traversal of the plasma flame 16a was sufficient. The traversal rate T10 and the temperature profile of the plasma flame 16a are set such that only drying, and no consolidation of the soot particles, takes place. After the drying operation of step 716 the process goes to step 718 which collapses the tubular member and, in the process, consolidates the silica soot and dopants deposited at steps 706 and 708, and dried at step 714.

Observed moisture content of preforms made in accordance with the FIG. 7 method was in the sub-parts per billion levels.

The present invention has significant advantages and benefits in relation to making optical fiber preforms. A major advantage is the production rate, achieved by its simultaneous deposition on the inner and outer surface of the tubular member. The production rate is further increased because the outside deposition can take place, as described, during the normal deposition steps, i.e., the deposition prior to the collapsing step, as well as during the collapsing step. This invention therefore provides a high rate fabrication of large preforms, without the additional steps, equipment, and time required of the prior art. This is clear in view of the typical processes for making larger preforms, which either deposit additional cladding glass, such as described by U.S. Pat. No. 5,522,007, or employ jacketing with another tube.

There are other benefits of the invention arising, in part, from its use of a plasma torch. The plasma torch does not use hydrogen and oxygen like a typical MCVD method, and therefore avoids the generation of water. For this reason the plasma torch further reduces the potential for $H_2$ and $OH^-$ diffusion into the core, which may be encountered using the MCVD method. Still another benefit of using a plasma torch is that it has much more heating power than an oxy-hydrogen torch, thereby allowing preforms to be made with a diameter of 125 millimeters or larger. Another benefit is that all of the inventions methods use a tube similar to those used for existing MCVD and PCVD methods. Still another benefit is that the deposited silica will typically have a very low moisture content, because the deposited layers are isolated from the surrounding environment via the deposition tube wall, which will not be further contaminated with $H_2$ or other H-containing species like $OH^-$ that was caused by and driven into the deposited area by an oxy-hydrogen heat source as the preform is made.

The above descriptions assume that the starting tubular member, such as item 12 of FIG. 1, become incorporated into the final preform. A low strength tube can be used, however, which is etched away by the plasma flame during the deposition steps. More particularly, at the beginning of the process, the chemical reactions caused by the CFIT chemicals within the hollow will cause deposition or deposition/consolidation on the inner surface as the plasma etches away the outer surface. After a number of iterations of the deposition steps the starting tubular member will be completely etched away, leaving only good quality, high strength glass formed by the inside deposition process. Concurrent inside/outside deposition can then proceed using the new tube as the target. This allows using a low strength sacrificial target tube, thereby providing a further degree of freedom in designing a preform. Namely, it does have any limits regarding the index of refraction of the starting tube.

While the present invention has been disclosed with reference to certain preferred embodiments, these should not be considered to limit the present invention.

One skilled in the art will readily recognize that variations of these embodiments are possible, each falling within the scope of the invention, as set forth in the claims below.

What is claimed is:

1. A method for making an optical fiber preform, comprising steps of:

(a) providing a tubular member having a center axis, a cylindrical void, an inner surface surrounding the void, and an outer surface, the inner surface and outer surface coaxial with one another about the center axis;

(b) simultaneously depositing an outer silica soot layer on the outer surface and consolidating the outer silica soot layer into a vitreous silica layer and depositing an inner soot layer on the inner surface and consolidating the inner soot layer into a vitreous silica layer;

(c) depositing a second outer silica soot layer on the outer surface of the previously deposited outer vitreous silica layer;

(d) simultaneously depositing an outer silica soot layer on the outer surface of the second outer silica soot layer and consolidating said outer silica soot layer and said second outer soot layer into a vitreous silica layer and depositing an inner soot layer on the inner surface and consolidating the inner soot layer into a vitreous silica layer; and (e) repeating steps (c) and (d) until a predetermined thickness of said vitreous silica layers are formed.

2. A method according to claim 1, wherein step (d) comprises steps of:

generating a plasma flame having a temperature profile relative to the outer surface;

rotating the tubular member about the center axis at a rate R; and traversing the plasma flame along said outer surface at a first traversal rate (TF1) while injecting CFOT chemicals into the plasma flame and injecting CFIT chemicals into the cylindrical void, wherein TF1 is such that the plasma flame causes said deposition and consolidation on the inside surface of the tubular member concurrent with said deposition and consolidation on the outside surface.

3. A method according to claim 2, wherein step (d) injects the CFIT chemicals to flow in a flow direction substantially parallel with the center axis and wherein said traversing is in said flow direction.

4. A method according to claim 1, wherein step (c) comprises steps of:

generating a plasma flame having a temperature profile relative to an outer surface;

rotating the tubular member about the center axis at a rate R; and traversing the plasma flame along said outer surface at a second rate TR1 while injecting CFOT chemicals into the plasma flame, wherein TR1 is such that the plasma flame effects deposition of the second outer silica soot layer in accordance with the CFOT chemicals, without substantial consolidation.

5. A method according to claim 1, wherein step (c) comprises steps of:

generating a plasma flame having a temperature profile relative to said outer surface of the previously deposited outer vitreous silica layer;

rotating the new tubular member about the center axis at a rate R; and traversing the plasma flame along said outer surface of the previously deposited outer at a second rate TR1 while injecting CFOT chemicals into the plasma flame, wherein TR1 is such that the plasma flame effects deposition of the second outer silica soot layer in accordance with the CFOT chemicals, without substantial consolidation.

6. A method according to claim 1, wherein step (c) comprises steps of:

generating a plasma flame having a temperature profile relative to an outer surface;

rotating the tubular member about the center axis at a rate R; and traversing the plasma flame along said outer surface at a tenth traversal rate TR5, wherein TR5 is such that the plasma flame effects consolidation of the outer silica soot layer.

7. A method for making an optical fiber preform, comprising steps of:

(a) providing a tubular member having a center axis, a cylindrical void, an inner surface surrounding the void, and an outer surface, the inner surface and outer surface coaxial with one another about the center axis;

(b) simultaneously depositing an outer silica soot layer on the outer surface and consolidating the outer silica soot layer into a vitreous silica layer and depositing an inner soot layer on the inner surface and consolidating the inner soot layer into a vitreous silica layer;

(c) depositing a second outer silica soot layer on the outer surface of the previously deposited outer vitreous silica layer concurrent with depositing a second silica soot layer on the inner surface;

(d) simultaneously depositing an outer silica soot layer on the outer surface of the second outer silica soot layer and consolidating outer silica soot layer and said second outer soot layer into a vitreous silica layer and depositing an inner soot layer on the inner surface and consolidating the inner soot layer and the second inner soot layer into a vitreous silica layer; and (e) repeating steps (c) and (d) until a predetermined thickness of said vitreous silica layers are formed.

8. A method according to claim 7, wherein step (d) comprises steps of:

generating a plasma flame having a temperature profile relative to the outer surface;

rotating the tubular member about the center axis at a rate R; and traversing the plasma flame along said outer surface of the second silica soot layer at a first traversal rate (TF1) while injecting CFOT chemicals into the plasma flame and injecting CFIT chemicals into the cylindrical void, wherein TF1 is such that the plasma flame causes said deposition and consolidation on the inside surface of the tubular member concurrent with said deposition of said outer silica soot layer and consolidation of said outer silica soot layer and said second outer silica soot layer.

9. A method according to claim 8, wherein step (d) injects the CFIT chemicals to flow in a flow direction substantially parallel with the center axis and wherein said traversing is in said flow direction.

10. A method according to claim 7, wherein step (c) comprises steps of:

generating a plasma flame having a temperature profile relative to an outer surface;

rotating the tubular member about the center axis at a rate R; and traversing the plasma flame along said outer surface of said previously deposited outer vitreous silica layer at a second rate TR2 while injecting CFOT chemicals into the plasma flame and injecting CFIT chemicals into the void, wherein TR2 is such that the plasma flame effects deposition of the second outer silica soot layer in accordance with the CFOT chemicals, without substantial consolidation, and deposition of the second inner silica soot layer in accordance with the CFIT chemicals without substantial consolidation.

11. A method for making an optical fiber preform, comprising steps of:

(a) providing a tubular member having a center axis, a cylindrical void, an inner surface surrounding the void, and an outer surface, the inner surface and outer surface coaxial with one another about the center axis;

(b) simultaneously depositing an outer silica soot layer on the outer surface and depositing an inner soot layer;

(c) simultaneously consolidating the outer silica soot layer into a vitreous silica layer, the outer surface of said vitreous silica layer becoming the outer surface of said tubular member, and the inner silica soot layer into a vitreous silica layer and (d) repeating steps (b) and (c) until a predetermined thickness of said vitreous silica layers are formed.

12. A method according to claim 11, wherein step (b) comprises steps of:

generating a plasma flame having a temperature profile relative to said outer surface;

rotating the tubular member about the center axis at a rate R; and traversing the plasma flame along said outer surface at a fifth traversal rate TF1 while injecting CFOT chemicals into the plasma flame and injecting CFIT chemicals into the cylindrical void, wherein TF3 is such that the plasma flame causes said deposition of the outer silica soot layer in accordance with the CFOT chemicals and deposition of the inner silica soot layer in accordance with the CFIT chemicals.

13. A method according to claim 12, wherein step (b) injects the CFIT chemicals to flow in a flow direction substantially parallel with the center axis and wherein said traversing is in said flow direction.

14. A method according to claim 11, wherein step (c) comprises steps of:

generating a plasma flame having a temperature profile relative to an outer surface;

rotating the tubular member about the center axis at a rate R; and traversing the plasma flame along said outer surface at a sixth rate TR3, wherein TR3 is such that the plasma flame effects said consolidation of the inner silica soot layer and said consolidation of said outer silica soot layer.

15. A method for making an optical fiber preform, comprising steps of:

(a) providing a tubular member having a center axis, a cylindrical void, an inner surface surrounding the void, and an outer surface, the inner surface and outer surface coaxial with one another about the center axis;

(b) simultaneously depositing an outer silica soot layer on the outer surface and depositing an inner soot layer of substantially pure silica soot on the inner surface;

(c) simultaneously depositing a second outer silica soot layer on the outer surface of the previously deposited outer silica soot layer and consolidating the outer silica soot layer and said second outer soot layer into a vitreous silica layer, the outer surface of said vitreous silica layer becoming the outer surface of said tubular member, and depositing dopants onto said inner soot layer and consolidating the inner soot layer and the dopants into a vitreous silica layer doped in accordance with said dopants; and (d) repeating steps (b) and (c) until a predetermined thickness of said vitreous silica layers are formed.

16. A method according to claim 15, wherein step (b) comprises steps of:

generating a plasma flame having a temperature profile relative to the outer surface;

rotating the tubular member about the center axis at a rate R; and traversing the plasma flame along said outer surface at a seventh traversal rate (TF4) while injecting CFOT chemicals into the plasma flame and injecting CFIT chemicals into the cylindrical void, wherein TF4 is such that the plasma flame causes said dopant deposition and consolidation on the inside surface of the tubular member concurrent with said deposition and consolidation on the outside surface.

17. A method according to claim 16, wherein step (b) injects the CFIT chemicals to flow in a flow direction substantially parallel with the center axis and wherein said traversing is opposite said flow direction.

18. A method according to claim 16, wherein step (c) injects the CFIT chemicals to flow in a flow direction substantially parallel with the center axis and wherein said traversing is in said flow direction.

19. A method according to claim 15, wherein step (b) comprises steps of:

generating a plasma flame having a temperature profile relative to said outer surface;

rotating the tubular member about the center axis at a rate R; and traversing the plasma flame along said outer surface at an eighth traversal rate TR4 while injecting CFOT chemicals into the plasma flame and injecting CFIT chemicals into the void, wherein TR4 is such that the plasma flame effects deposition of the second outer silica soot layer in accordance with the CFOT chemicals, without substantial consolidation, and deposition of the inner substantially pure silica soot layer without substantial consolidation, and the CFIT chemicals consist essentially of $SiCl_4$.

20. A method for making an optical fiber preform, comprising steps of:

(a) providing a tubular member having a center axis, a cylindrical void, an inner surface surrounding the void, and an outer surface, the inner surface and outer surface coaxial with one another about the center axis;

(b) simultaneously depositing an outer silica soot layer on the outer surface, without substantial consolidation, and depositing an inner soot layer on the inner surface and consolidating the inner soot layer into a vitreous silica layer;

(c) consolidating the outer soot layer into a vitreous silica layer; and (d) repeating steps (b) and (c) until a predetermined thickness of said vitreous silica layers are formed.

21. A method according to claim 20, wherein step (b) comprises steps of:

generating a plasma flame having a temperature profile relative to the outer surface;

rotating the tubular member about the center axis at a rate R; and traversing the plasma flame along said outer surface at a ninth traversal rate (TF5) while injecting CFOT chemicals into the plasma flame and injecting CFIT chemicals into the cylindrical void, wherein TF5 is such that the plasma flame causes said deposition and consolidation on the inside surface of the tubular member concurrent with said deposition without consolidation on the outer surface.

22. A method according to claim 20, wherein step (b) injects the CFIT chemicals to flow in a flow direction substantially parallel with the center axis and wherein said traversing is in said flow direction.

* * * * *